United States Patent [19]

Lass

[11] 4,350,839
[45] Sep. 21, 1982

[54] CABLE LOCK FOR ELECTRICAL OUTLET BOX

[75] Inventor: John L. Lass, Homewood, Ill.

[73] Assignee: Square D Company, Palatine, Ill.

[21] Appl. No.: 170,306

[22] Filed: Jul. 18, 1980

[51] Int. Cl.$^3$ .............................................. H02G 3/18
[52] U.S. Cl. .................. 174/65 G; 174/153 G; 248/56; 339/103 B
[58] Field of Search ............. 174/65 R, 65 G, 153 G, 174/135; 248/56; 339/103 R, 103 B, 103 C, 105, 107

[56] References Cited

U.S. PATENT DOCUMENTS

| | | | |
|---|---|---|---|
| 2,340,703 | 2/1944 | Schwabacher | 339/103 R |
| 3,424,856 | 1/1969 | Coldren | 248/56 X |
| 3,493,205 | 2/1970 | Bromberg | 248/56 |
| 3,497,923 | 3/1970 | Seckerson | 248/56 X |
| 3,701,505 | 10/1972 | Klumpp, Jr. | 248/56 |

Primary Examiner—B. A. Reynolds
Assistant Examiner—David A. Tone
Attorney, Agent, or Firm—John R. Garrett; Carmen B. Patti; Richard T. Guttman

[57] ABSTRACT

This disclosure depicts a novel apparatus for securing an electrical cable in an electrical outlet box having one or more openings in the walls or bottom of the electrical outlet box. In particular, this apparatus, a cable locking device, comprises: a base portion; a flexing member having a first end of the flexing member attached to a first end of the base, the flexing member also having an aperture for receiving an electrical cable; a locking section attached to a second end of the flexing member; a cable engaging portion extending from the locking section towards the base; and a cable contact section on a second end of the base. The cable locking device fits into the opening in the electrical outlet box and locks the electrical cable into position.

6 Claims, 7 Drawing Figures

CABLE LOCK FOR ELECTRICAL OUTLET BOX

DESCRIPTION

CROSS-REFERENCE TO RELATED APPLICATIONS

This application relates to, but is no way dependent upon, copending applications of common ownership herewith, including: Ser. No. 068,315 filed Aug. 20, 1979 and Ser. No. 081,944 filed Oct. 4, 1979.

BACKGROUND OF THE INVENTION AND PRIOR ART STATEMENT

The present invention relates generally to electrical outlet boxes adapted to have electrical devices supported therein and attached to a cable extending through an opening in a wall of the outlet box, and more specifically to a cable locking device for locking the cable within the box.

Heretofore, cable connectors for supporting cables in components such as outlet boxes consisted primarily of a metal collar which had a peripheral thread and utilized a nut received on the thread to connect the collar into an outlet box. Subsequently a second clamping means usually grasped the cable and cooperated with the threaded collar to retain the cable within the outlet box. Not only is such an arrangment costly in terms of manufacturing several parts, there is a tremendous labor cost of inserting the various parts in appropriate sequence within the electrical box.

Another type of cable connector is a non-metallic bushing having a strain relief feature. These devices typically are inserted into the opening in the outlet box and incorporate a retaining means to prevent removal from the box. The cable is held in a position external from the box by the retaining means on the connector.

FIG. 1 of U.S. Pat. No. 3,701,505 shows a typical non-metallic bushing having a retaining means. The bushing is made to snap into the opening in the electrical outlet box and is retained in the opening by a number of spring like fingers. The retaining means for the electrical cable is external to the electrical outlet box and comprises a clamping mechanism which is operated by two screws.

FIGS. 9 & 10 of U.S. Pat. No. 3,493,205 show another example of a non-metallic bushing with a retaining means. This device uses a pawl means to engage the ratchet teeth of a plug member which traps the electrical cable. The bushing is snapped into the hole in the electrical outlet box.

U.S. Pat. Nos. 3,701,505 and 3,493,205 are in the opinion of applicant the closest prior art of which applicant is aware, but applicant does not represent that a search has been made or that no better art exists. A concise explanation of the relevance of each item has been given above and a copy of each item is being submitted with this specification. The relevance of the prior art indicated should not be given a limited interpretation. A cited prior art item may be found to have relevance in a passage other than the one referred to, or to have relevance in a sense different than as stated.

OBJECTS OF THE INVENTION

It is a general object of the present invention to provide a cable locking device for securing an electrical cable in an electrical outlet box.

It is another object of the present invention to provide a cable locking device having a minimum number of parts and capable of being molded from non-metallic materials.

It is another object to provide a device which is easy and inexpensive to manufacture.

It is yet another object to provide a cable locking device which requires a minimum amount of time for installation in an electrical outlet box and a minimum amount of time for installation of the electrical cable.

A further object of the present invention is to provide a cable locking device which can be used with non-metallic or metallic electrical boxes having various size openings.

BRIEF DESCRIPTION OF THE DRAWINGS

Features of the present invention which are believed to be novel are set forth with particularly in the appended claims. The invention together with objects and advantages may best be understood by reference to the following description taken in conjunction with the acompanying drawings, in the several figures of which like reference numerals identify like elements, and in which:

DESCRIPTION OF THE PREFERRED EMBODIMENT

This invention pertains to a novel apparatus for securing an electrical cable in an electrical outlet box having one or more openings in the walls or bottom of the electrical outlet box. The novel apparatus, referred to as a cable locking device, is inexpensive and efficient to manufacture and requires a minimum amount of time to assemble with the electrical outlet box and the electrical cable. Due to the high cost of materials and labor the electrical industry has sought a solution to the problem of expensive and time consuming connectors which are presently being used for connecting electrical cables to electrical outlet boxes. This novel invention fulfills these requirements.

The present invention will now be described. In general terms, this invention involves a cable locking device for securing an electrical cable to an electrical outlet box having one or more openings in the walls or bottom of the electrical outlet box. The cable locking device comprises: a base portion; a flexing member having a first end of the flexing member attached to a first end of the base, the flexing member also having an aperture for receiving an electrical cable; a locking section attached to a second end of the flexing member; a cable engaging portion extending from the locking section towards the base; and a cable contact section on a second end of the base. The cable locking device fits into the opening in the electrical outlet box. The base contacts the bottom of the electrical outlet box and the locking section contacts the upper portion of the opening in the electrical outlet box. The flexing member contacts the outer wall of the electrical outlet box. The flexing member is larger than the base and the locking section so that the flexing member contacts the outer wall of the electrical outlet box after the base and the locking section have passed through the opening in the electrical outlet box. The cable locking device is inserted into the opening in the electrical outlet box by flexing the flexing member such that the cable engaging portion is moved toward the base allowing the locking section to pass by the upper wall portion of the opening of the electrical outlet box. The flexing member is then allowed to assume its original position thereby engaging the locking section with the upper wall of the electrical outlet box. The base engages the bottom of the electrical outlet box or the bottom portion of the opening. The cable locking device locks the electrical cable into position when the electrical cable is inserted through the cable receiving aperture. The cable deflects the cable engaging portion as the cable is inserted. The cable engaging portion prevents movement of the cable out of the electrical outlet box by cooperating with the cable contact section.

Figure 1:
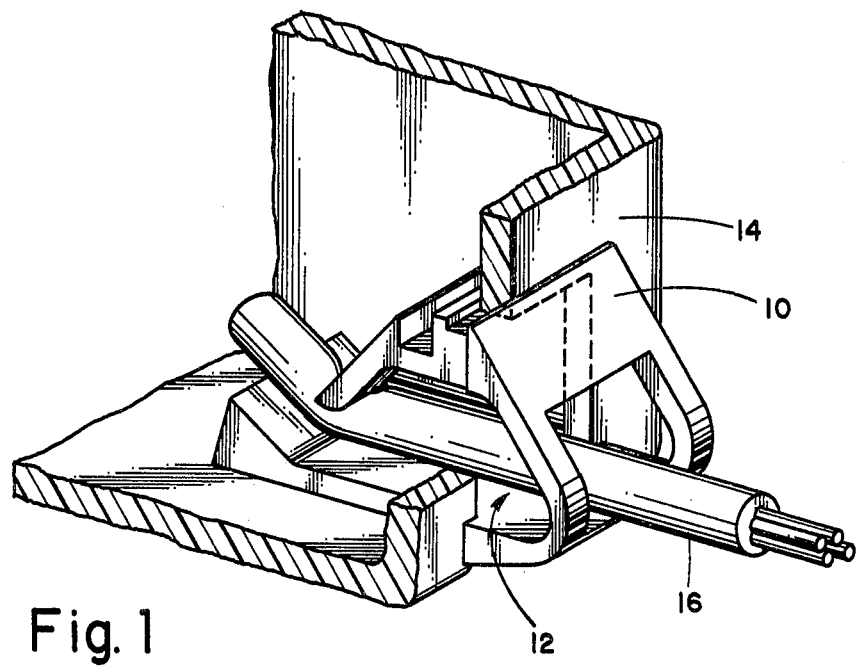
FIG. 1 is a perspective view of the novel cable locking device positioned in an electrical outlet box and securing an electrical cable.
Figure 2:
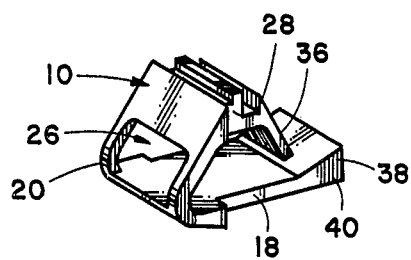
FIGS. 2 & 3 are perspective views of the cable locking device.
Figure 3:
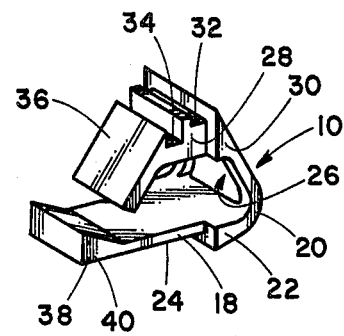

The novel apparatus is illustrated in FIGS. 1, 2 & 3 and will now be described in detail.

FIG. 1 depicts a cable locking device 10 positioned in an opening 12 of an electrical outlet box 14. The cable locking device 10 secures an electrical cable 16 to the electrical outlet box 14. The electrical box 14 depicted is of a standard type in the industry and is of a non-metallic material, such as NORYL ® and has substantially rectangular openings 12. Electrical codes require that the electrical cable within the box must be secured such that it cannot be pulled back out of the box. The present invention is a novel apparatus for securing the cable in compliance with present electrical codes.

Referring to FIGS. 2 & 3, the cable locking device 10 comprises a substantially rectangular base portion 18. A flexing member 20 has a first end 22 attached to a first end 24 of the base 18. The flexing member 20 also has a substantially square aperture 26 for receiving the electrical cable 16. A locking section 28 is attached to a second end 30 of the flexing member 20. The locking section has at least one horizontal groove 32 in its uppermost section for engaging a portion of the wall defining the opening 12 in the electrical outlet box 14. In the embodiment shown the locking section 28 has a second horizontal groove 34. The two horizontal grooves 32 & 34 have different depths and are located side-by-side in the uppermost portion of the locking section 28. The different depths allow for engaging different size rectangular openings in the electrical boxes. The horizontal groove of lesser depth is located adjacent the flexing member 20. A cable engaging portion 36 extends downward from the locking section 28 towards the base 18. A cable deflection ramp 38 is attached to a second end 40 of the base 18. The cable deflection ramp 38 cooperates with the cable engaging portion 36 to lock the electrical cable 16 into position within the cable locking device 10.

The cable locking device 10 fits into the substantially rectangular opening 12 in the electrical outlet box 14. The base 18 contacts the bottom of the electrical outlet box 14, the horizontal groove 32 in the locking section 28 receives the upper portion of the opening 12 in the electrical outlet box 14 and the flexing member 20 contacts the outer wall of the electrical outlet box 14. The flexing member 20 is larger than the base 18 and the locking section 28. The flexing member 28 contacts the outer wall of the electrical box 14 after the base 18 and the locking section 28 have passed through the opening 12. The cable locking device 10 is inserted into the opening 12 in the electrical outlet box 14 by flexing the flexing member 20 such that the cable engaging portion 36 is moved towards the base 18 allowing the locking section to pass by the upper wall portion of the opening 12. The flexing member 20 is then allowed to assume its original position thereby engaging the horizontal groove 32 in the locking section 28 with the upper wall of the opening 12 in the electrical outlet box 14 and the base engaging the bottom of the opening 12 in the electrical outlet box 14. The cable locking device 10 locks electrical cable 16 in position when the electrical cable 16 is inserted through the cable receiving aperture 26 and is deflected by the cable deflection ramp 38 and engaged by the cable engaging portion 36. This prevents movement of the cable 16 out of the electrical box 14.

Figure 4:
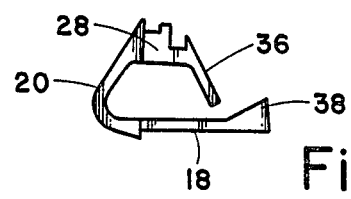
FIG. 4 is an end view of the cable locking device before insertion into the electrical outlet box and before insertion of the electrical cable.

FIG. 4 is an end view of the cable locking device 10 showing the position of its elements prior to being inserted into an electrical outlet box 14.

Figure 5:
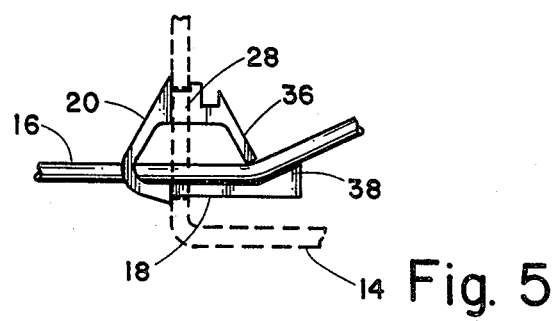
FIG. 5 is an end view of the cable locking device inserted in the electrical outlet box and securing an electrical cable.

FIG. 5 is an end view of the same cable locking device 10 after it has been inserted in the electrical outlet box 14 and after a cable 16 has been secured by the cable locking device 10. As can be seen in FIG. 5, after the cable has been inserted in the cable locking device 10 the cable 16 is deflected upwards within the electrical outlet box 14 by the cable deflection ramp 38. The cable engaging section 36 presses against the cable 16 holding it in position. If cable 16 experiences a force pulling it out of the electrical outlet box 14 the cable deflection ramp 38 cooperates with the cable engaging section 36 to force the cable engaging section 36 to dig into the cable 16 and resist movement of the cable 16 out of the electrical outlet box 14. The cable engaging section 36 resists movement upward due to the groove 32 in the locking section 28 contacting the upper portion of the opening 12. The more pull the cable 16 experiences the greater is the presser resisting the removal of the cable 16 until the limit of the strength of the materials is reached.

In the preferred embodiment the cable locking device is molded out of DuPont, Nylon, Zytel #101.

Figure 6:
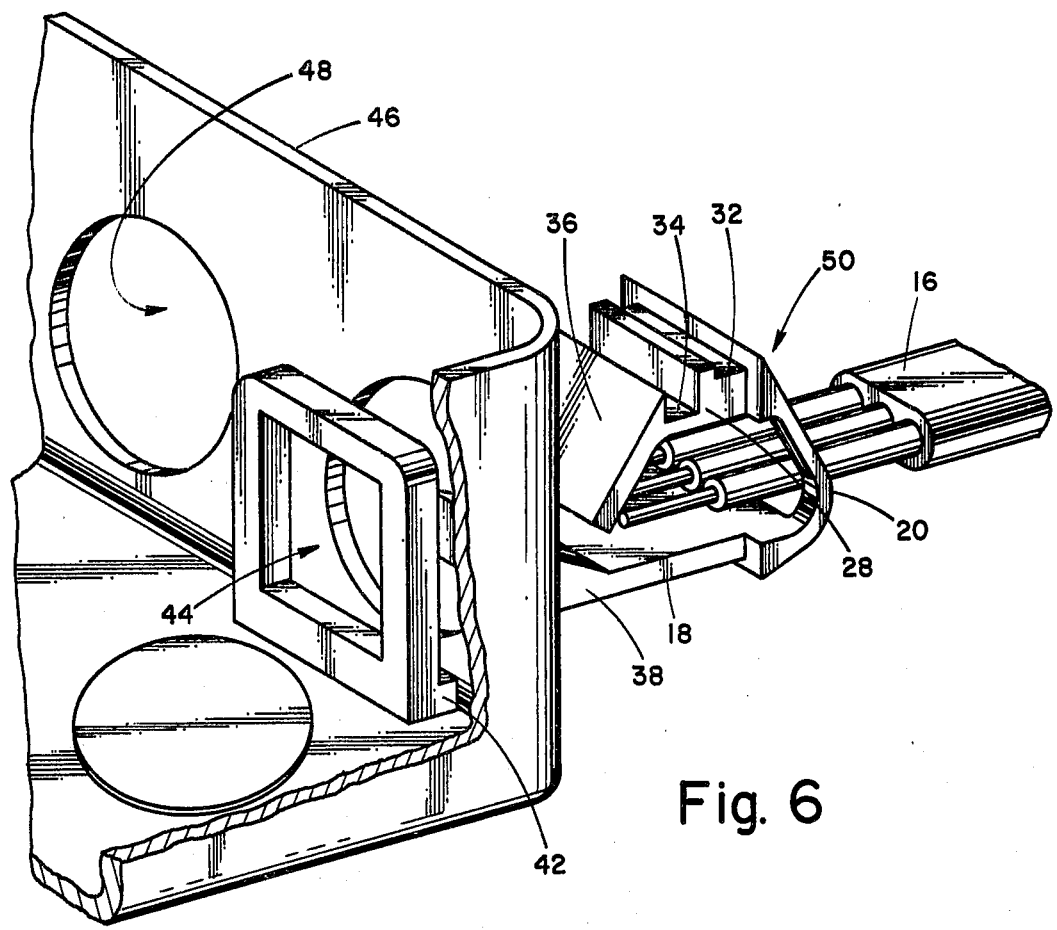
FIG. 6 is a perspective view of a alternative embodiment of the present invention.
Figure 7:
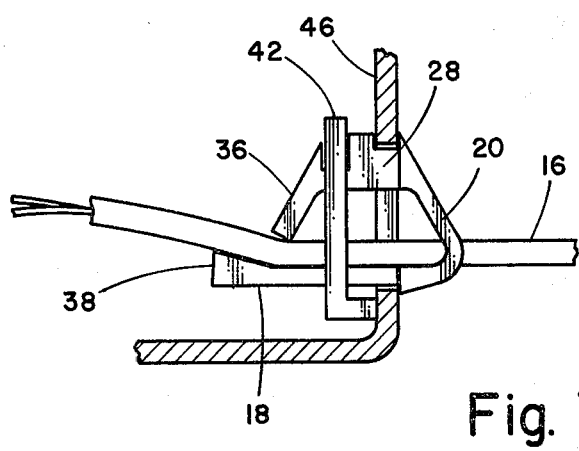
FIG. 7 is an end view of the alternative embodiment showing the cable locking device secured to the electrical outlet box and retaining the electrical cable.

FIGS. 6 & 7 depict an alternative embodiment of the invention. This alternative embodiment makes it practical to use the cable locking device in metallic or non-metallic electrical outlet boxes having non-rectangular or irregular openings in the walls and bottom of electrical outlet boxes. In this alternative embodiment the cable locking device further comprises a retaining element 42 which is of generally square shape and has a substantially square aperture 44. As shown in FIG. 6 the base portion 18, the flexing member 20, the locking section 28, the cable engaging portion 36, and the cable deflection ramp 38 are identical to those previously described.

The retaining element 42 is positioned within the electrical outlet box 46. The electrical outlet box 46 depicted has circular openings 48 in the walls. The base portion 18, the locking section 28, and cable engaging portion 36 are passed through one of the openings 48 and through the square aperture 44 of the retaining element 42. The upper portion of the retaining element 42 is located in the horizontal groove 34 of greater depth in the locking section 28 when the cable locking device 50 is assembled with the electrical outlet box 46 and is depicted in an end view in FIG. 7. With the cable locking device 50 in position the base 18 contacts the bottom of the opening 48 in the electrical outlet box 46. The horizontal groove 32 in the locking section 28 receives the upper portion of the opening 48 and the flexing member 20 contacts the outer wall of the electrical box 46. Thus, the cable locking device is securely clamped to the electrical outlet box 46. The cable 16 is locked in place in the same manner as previously described.

The invention is not limited to the particular details of the method depicted and other modifications and applications are contemplated. For example, the locking member may have any number of grooves of varying depths and the grooves may be located on the locking member in any order. The aperture in the flexing member need not be square and could be open to one side. The cable locking device could be made of a metallic material or a combination of non-metallic and metallic materials. The cable locking device could be structured to receive more than one cable. Certain other changes may be made in the above described method without departing from the true spirit and scope of the invention herein involved. It is intended therefore that the subject matter and the above depiction shall be interpreted as illustrative and not in a limiting sense.

I claim:

1. A cable locking device comprising:
   an electrical outlet box having one or more openings in its walls or bottom;
   an electrical cable inserted through one of the openings;
   a base portion;
   a cable engaging portion extending toward said base;
   a cable contact section on a second end of said base;
   a flexing member having a first end of said flexing member attached to a first end of said base, said flexing member also having an aperture receiving said electrical cable;
   a locking section attached to a second end of said flexing member having at least two horizontal grooves of different depths in its upper portion, the horizontal groove of greater depth being adjacent said cable engaging portion extending from said locking section and the horizontal groove of lesser depth being adjacent said flexing member, said cable locking device further comprising a retaining element of generally square shape and having a substantially square aperture, said retaining element being positioned within said electrical box and receiving said base portion and said locking section within the substantially square opening, said upper portion of said retaining element being located in said horizontal groove of greater depth in said locking section, said retaining element preventing said base portion, said cable contact section, said locking section, and said flexing member being removed from the electrical outlet box;
   wherein said base portion and locking section fit into the opening in the electrical outlet box, said base contacting the bottom of the opening of the electrical outlet box and the locking section contacting the upper portion of the opening in the electrical outlet box and the flexing member contacting the outer wall of the electrical outlet box,
   wherein said flexing member is larger than said base and said locking section so that said flexing member contacts the outer wall of the electrical outlet box after said base and said locking system have passed through the opening in the electrical outlet box,
   wherein said base portion and locking section are inserted into the opening in the electrical outlet box by flexing said flexing member such that said cable engaging portion is moved towards said base allowing said locking section to pass by the upper wall portion of the opening in the electrical outlet box, and allowing said flexing member to assume its original position thereby engaging said locking section with the upper wall of the opening in the electrical outlet box and said base engaging the bottom of the opening in the electrical outlet box, and
   also wherein said cable locking device locks the electrical cable in position when the electrical cable is inserted through said cable receiving aperture and deflects the cable engaging portion, said cable engaging portion prevents movement of the cable out of the electrical outlet box by cooperating with said cable contact section.

2. A cable locking device comprising:
   an electrical outlet box have one or more openings in its walls or bottom;
   an electrical cable inserted through one of the openings;
   a substantially rectangular base portion;
   a cable deflection section on a second end of said base;
   a cable engaging portion extending toward said base;
   a flexing member having a first end of said flexing member attached to a first end of said base, said flexing member also having an aperture receiving said electrical cable;
   a locking section attached to a second end of said flexing member having at least two horizontal grooves of different depths in its upper section, the horizontal groove of greater depth being adjacent said cable engaging portion extending from said locking section and the horizontal groove of lesser depth being adjacent said flexing member, said cable locking device further comprising a retaining element of generally square shape and having a substantially square aperture, said retaining element being positioned within said electrical box and receiving said base portion and said locking section within the substantially square opening, said upper portion of said retaining element being located in said horizontal groove of greater depth in said locking section, said retaining element preventing said base portion, said cable contact section, said locking section, and said flexing member being removed from the electrical outlet box; and
   wherein said cable locking device fits into the opening in the electrical outlet box, said base contacting the bottom of the opening of the electrical outlet box and the locking section contacting the upper portion of the opening in the electrical outlet box and the flexing member contacting the outer wall of the electrical box,
   wherein said flexing member is larger than said base and said locking section so that said flexing member contacts the outer wall of the electrical outlet box after said base and said locking section have passed through the opening in the electrical outlet box, wherein said base portion and locking section are inserted into the opening in the electrical outlet box by flexing said flexing member such that said cable engaging portion is moved towards said base allowing said locking section to pass by the upper wall portion of the opening in the electrical outlet box, and allowing said flexing member to assume its original position thereby engaging said locking section with the said upper wall of the opening in the electrical outlet box and said base engaging the bottom of the opening in the electrical outlet box, and also wherein said cable locking device locks the electrical cable in position when the electrical cable is inserted through said cable receiving aperture and deflects the cable engaging portion as the cable, itself, is deflected by said cable deflection section, and whereby said cable engaging portion prevents movement of said cable out of the electrical box by cooperating with said cable deflection section.

3. A cable locking device comprising:
an electrical outlet box having one or more substantially rectangular openings in its walls or bottom;
an electrical cable inserted through one of the openings;
a substantially rectangular base portion;
a flexing member having a first end of said flexing member attached to a first end of said base, said flexing member also having a substantially square aperture receiving said electrical cable;
a locking section attached to a second end of said flexing member, said locking section having at least one horizontal groove in its uppermost section for engaging a portion of the wall of the opening in the electrical outlet box;
a cable engaging portion extending downward from said locking section toward said base; and
a cable deflection ramp attached to a second end of said base, said cable deflection ramp cooperating with said cable engaging portion to lock the cable into position within the cable locking device;
wherein said cable locking device fits into the substantially rectangular opening in the electrical outlet box, said base contacting the bottom of the opening of the electrical outlet box and the horizontal groove in the locking section receiving the upper portion of the opening in the electrical outlet box and the flexing member contacting the outer wall of the electrical outlet box;
wherein said flexing member is larger than said base and said locking section and said flexing member contacts the outer wall of the electrical box after said base and said locking section have passed through the opening of the electrical outlet box,
wherein said base portion and locking section are inserted into the opening in the electrical outlet box by flexing said flexing member such that said cable engaging portion is moved towards said base allowing said locking section to pass by the upper wall portion of the opening in the electrical outlet box, and then allowing said flexing member to assume its original position after insertion in the opening in the electrical box, thereby engaging said horizontal groove in said locking section with the upper wall of the opening in the electrical outlet box and said base engaging the bottom of the opening in the electrical outlet box, and also wherein said cable locking device locks the electrical cable in position when the electrical cable is inserted through said cable receiving aperture and is deflected by said cable deflection ramp and engaged by said cable engaging portion, thereby preventing movement of said cable out of the electrical box.

4. The device defined in claim 3 wherein said locking section has two horizontal grooves of different depths located side-by-side in the uppermost portion of the locking section for engaging different size rectangular openings in the electrical boxes, said horizontal groove of greater depth being located adjacent to said cable engaging portion and said horizontal groove of lesser depth being located adjacent said flexing member.

5. A cable locking device comprising:
an electrical outlet box having one or more non-rectangular or irregular openings in its walls or bottom;
an electrical cable inserted through one of the openings;
a substantially rectangular base portion;
a flexing member having a first end of said flexing member attached to a first end of said base, said flexing member also having a substantially square aperture receiving said electical cable;
a locking section attached to a second end of said flexing member, said locking section having two horizontal grooves of different depths in its upper section, the horizontal groove of lesser depth being adjacent said flexing member;
a cable engaging portion extending downward from said locking section toward said base;
a cable deflection ramp attached to a second end of said base, said cable deflection ramp cooperating with said cable engaging portion to lock the cable into position within the cable locking device; and
a retaining element of generally square shape and having a substantially square aperture, said retaining element being positioned within said electrical outlet box and receiving said base portion and said locking section within the substantially square opening, said upper portion of said retaining element being located in said horizontal groove of greater depth in said locking section;
wherein said base portion and locking section fit into the opening in the electrical outlet box, said base contacting the bottom of the opening in the electrical outlet box and the horizontal groove of lesser depth in the locking section receiving the upper portion of the opening in the electrical outlet box and the flexing member contacting the outer wall of the electrical box,
wherein said flexing member is larger than said base and said locking section and said flexing member contacts the outer wall of the electrical box after said base and said locking section have passed through the opening of the electrical outlet box,
wherein said base portion and locking section are inserted into the opening in the electrical outlet box by flexing said flexing member such that said cable engaging portion is moved towards said base allowing said locking section to pass by the upper wall portion of the opening in the electrical outlet box, and then allowing said flexing member to assume its original position after insertion in the opening in the electrical box, thereby engaging the horizontal groove of lesser depth in said locking section with the upper wall of the opening in the electrical outlet box and said base engaging the bottom of the opening in the electrical outlet box, said retaining element preventing said base portion, said cable deflection ramp, said locking section, and said cable engaging portion being removed from the electrical outlet box, and also wherein said cable locking device locks the electrical cable in position when the electrical cable is inserted through said cable receiving aperture and is deflected by said cable deflection ramp and engaged by said cable engaging portion, thereby preventing movement of said cable out of the electrical box.

6. A cable locking device comprising:

an outlet box having one or more openings in its walls or bottom;

an electrical cable inserted through one of the openings;

a base portion;

a flexing member having a first end of said flexing member attached to a first end of said base, said flexing member also having an aperture receiving said electrical cable;

a cable engaging portion extending toward said base;

a cable contact section having a cable deflection ramp such that said cable locking device locks the electrical cable in position when the electrical cable is inserted through said cable receiving aperture and deflects said cable engaging portion as the cable, itself, is deflected by said cable deflection ramp, and whereby said cable engaging portion prevents movement of said cable out of the electrical outlet box by cooperating with said cable deflection ramp;

a locking section attached to a second end of said flexing member having at least two horizontal grooves of different depths in its upper portion, the horizontal groove of greater depth being adjacent said cable engaging portion extending from said locking section and the horizontal groove of lesser depth being adjacent said flexing member, said cable locking device further comprising a retaining element of generally square shape and having a substantially square aperture, said retaining element being positioned within said electrical box and receiving said base portion and said locking section within the substantially square aperture, said upper portion of said retaining element being located in said horizontal groove of greater depth in said locking section, said retaining element preventing said base portion, said cable contact section, said locking section, and said cable engaging portion being removed from the electrical outlet box when the opening in the electrical outlet box is of a non-rectangular or irregular shape;

wherein said base portion and locking section fit into the opening in the electrical outlet box, said base contacting the bottom of the opening of the electrical outlet box and the locking section contacting the upper portion of the opening in the electrical outlet box and the flexing member contacting the outer wall of the electrical outlet box, wherein said flexing member is larger than said base and said locking section so that said flexing member contacts the outer wall of the electrical outlet box after said base and said locking section have passed through the opening in the electrical outlet box, wherein said base portion and locking section are inserted into the opening in the electrical outlet box by flexing said flexing member such that said cable engaging portion is moved towards said base allowing said locking section to pass by the upper wall portion of the opening in the electrical outlet box, and allowing said flexing member to assume its original position thereby engaging said locking section with the upper wall of the opening in the electrical outlet box and said base engaging the bottom of the opening in the electrical outlet box, and also wherein said cable locking device locks the electrical cable in position when the electrical cable is inserted through said cable receiving aperture and deflects the cable engaging portion, said cable engaging portion prevents movement of the cable out of the electrical outlet box by cooperating with said cable contact section.

* * * * *